United States Patent [19]

Holte

[11] 4,403,639
[45] Sep. 13, 1983

[54] STUD ARRANGEMENT ON CHAINS FOR MOTOR VEHICLES, AND A METHOD OF PRODUCING SUCH CHAINS

[76] Inventor: Bjarne Holte, N-3789 Kjøllbrønn, Norway

[21] Appl. No.: 301,258

[22] Filed: Sep. 11, 1981

[30] Foreign Application Priority Data

Oct. 2, 1980 [NO] Norway .................. 802810

[51] Int. Cl.³ .............. B60C 27/00; B21L 17/00; B23K 11/04
[52] U.S. Cl. ............................... 152/245; 59/31; 59/35 R; 148/15.5; 148/16.5; 148/16.6; 152/231; 219/98; 219/99; 403/271
[58] Field of Search .............. 152/245, 243, 171, 172, 152/208, 223, 224, 231, 232, 239, 240; 59/10, 12, 21, 23, 31, 35 R, 35 CP; 219/98, 99, 52; 238/14; 403/271, 265; 148/16.5, 16.6, 15.5

[56] References Cited

U.S. PATENT DOCUMENTS

| | | | |
|---|---|---|---|
| 1,532,425 | 4/1925 | Markwick | 152/239 X |
| 2,555,470 | 6/1951 | Carlson | 152/245 |
| 3,144,068 | 8/1964 | Campbell, Jr. | 152/245 |
| 3,282,318 | 11/1966 | Nylund | 152/245 X |
| 3,671,710 | 6/1972 | Coombs | 219/99 |

FOREIGN PATENT DOCUMENTS

2126622 12/1972 Fed. Rep. of Germany .

*Primary Examiner*—Edward C. Kimlin
*Assistant Examiner*—Thomas Bokan
*Attorney, Agent, or Firm*—Pollock, Vande Sande & Priddy

[57] ABSTRACT

A stud arrangement on casehardened studded chains for motor vehicles, wherein the studs consist of a steel body which is permanently welded to a chain link and provided with a centrally disposed hard metal pin. The hard metal pin is inserted into the steel body such that it is covered on all sides by steel material of a thickness which at least corresponds to the casehardening penetration depth. In a method for producing such studded chains, an inwardly converging blind hole is cut out from one end of the steel body. The hard metal pin, of a shape corresponding to the conical hole, is forced into the hole, the pin being shorter than the blind hole so that a skirt is formed outside the pin. The edge of the skirt is beveled, and the steel body with the metal pin therein is joined to the chain by resistance welding in a machine for welding studs onto chain links, the body with the pin being moved gradually toward the chain link as the beveled edge melts and flows radially outwards. The studded chain is then case hardened.

2 Claims, 2 Drawing Figures

STUD ARRANGEMENT ON CHAINS FOR MOTOR VEHICLES, AND A METHOD OF PRODUCING SUCH CHAINS

BACKGROUND OF THE INVENTION

The present invention relates to a stud arrangement on chains for motor vehicles, and a method of producing such chains.

Heavy vehicles in particular, such as trucks, buses, tractors and the like, must often use studded chains on the tires in difficult winter driving conditions. Even though the studs are made of casehardened steel, they become worn down relatively quickly when driven on an ice-coated, asphalted road. This means a rather large expense for the owner of the vehicle.

It is known from German Pat. No. 2,126,622 to place a hard metal pin in a steel body which is welded onto a chain link. The steel bodies are not conventional chain studs and therefore cannot be joined to the chain links using conventional automatic welding machines. There is also a risk that the hard metal pins may become damaged when subjected to the casehardening which is necessary to give the chain links themselves the desired quality.

SUMMARY OF THE INVENTION

The object of the invention, therefore, is to provide a studded chain which can be produced in a simple manner using the same automated machines that are used for conventional chains, and such that the chain with the added studs can be casehardened in the ordinary manner. This is obtained in accordance with the invention by a stud arrangement for casehardened studded chains for motor vehicles wherein the studs consist of a steel body which is permanently welded to a chain link and provided with a centrally disposed hard metal pin, the characterizing feature being that the hard metal pin is inserted into the steel body such that it is covered on all sides by steel material of a thickness which at least corresponds to the casehardening penetration depth. In this way, the hard metal pin is protected from damage during casehardening, and when the studded chain later goes into actual use the material covering the hard metal pin will become worn down, exposing the hard metal pin which then becomes functional.

The invention also comprises a method of producing studded chains wherein the studs consist of a steel body which is permanently welded to a chain link and provided with a centrally disposed hard metal pin, and the characteristic features of the method are that an inwardly converging blind hole is cut out from one end of a steel body, a hard metal pin of a shape corresponding to the conical hole is pressed into the hole, the pin being shorter than the blind hole so that a skirt is formed adjacent the open end of the blind hole, the edges of the skirt are beveled, and the steel body with the centrally infixed hard metal pin is joined to the chain by resistance welding the skirted end of the body to a chain link in a machine for welding studs onto chain links, the steel body with the pin therein gradually being moved toward the chain link as the beveled end melts and flows radially outwards. The resulting studded chain link is then case hardened.

BRIEF DESCRIPTION OF THE DRAWINGS

The invention will be described in greater detail in the following with reference to the accompanying drawings, wherein.

DETAILED DESCRIPTION

Figure 1:
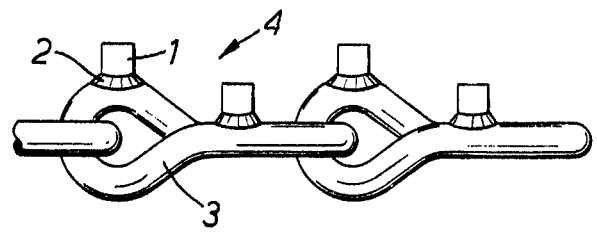
FIG. 1 shows a pair of links in a crosslink for a motor vehicle chain, with studs attached.

FIG. 1 illustrates how steel studs 1 are joined by means of welding 2 to twisted chain links 3 in a crosslink 4.

Prior to joining a stud to its associated chain link, the stud 1 has the form of a cylindrical steel body 5 of the same quality steel as the chain link 3.

Figure 2:
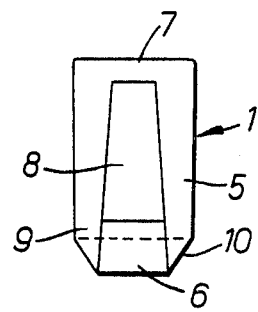
FIG. 2 shows a stud in accordance with the invention in cross section.

As seen in FIG. 2, the steel body 5 is provided with a conical blind hole 6 extending inwardly from the rearward end of the stud. The hole 6 converges inwardly and terminates a distance from the free end 7. A similarly shaped conical hard metal pin 8 is pressed into the blind hole 6. The hard metal pin 8 is shorter than the extension of the hole 6, and in this way a rearwardly projecting skirt 9 will be formed adjacent the open end of blind hole 6. This skirt is conically beveled at 10. The beveled or skirted end of the body 5 is then juxtaposed to a chain link 3 and resistance welded to said link, the body 5 with the pin 8 therein being moved toward the chain link as the welding step proceeds.

FIG. 1 shows how, during the aforementioned welding procedure, the weld seam 2 has flowed radially outwards, so that the stud 1 obtains a large surface of attachment to chain link 3. Owing to the conical configuration of the skirted end 9, one obtains a favorable weld path, since the flow of metal will occur first at the central part of the sleeve defined by skirt 9. The conical shape provides room for the method which melts at the central part to flow outwardly, and a solid sole for the stud is thus built up. Tests have shown that studs attached in this manner are so solidly anchored to the chain link that during impact tests, the chain link will break before one manages to break off the stud.

Following the welding of the stud to its associated chain link, the studded chain link is case hardened in known fashion. The portion of steel body 5 which covers pin 8 prevents the pin from being damaged during this case hardening step. When the studded chain is later put to actual use, the steel body 5 is worn away in the course of such use, at which time the hard metal-pin becomes exposed and effective for its intended purpose.

Having described my invention, I claim:

1. A casehardened studded chain for motor vehicles comprising a plurality of casehardened chain links each of which has at least one stud extending outwardly therefrom, each of said studs consisting of a steel body which is permanently welded to a casehardened chain link and provided with a centrally disposed hard metal pin, the hard metal pin being located within the steel body such that the sides of said pin projecting away from said chain link and the end of said pin remote from said chain link are covered by steel material of said body, the covering portions of said steel material having a thickness which is at least equal to the casehardening penetration depth of said casehardened chain link.

2. A method of producing studded chains of the type comprising a plurality of casehardened chain links each of which has at least one stud extending outwardly therefrom and wherein each of the studs consists of a steel body which is permanently welded to a chain link and is provided with a centrally disposed hard metal pin, said method comprising the steps of cutting an inwardly converging blind hole into one end of the steel body, forcing into said blind hole a hard metal pin of a shape corresponding to the conical hole, the pin being shorter than the blind hole so that a skirt is formed adjacent the open end of said hole, beveling the edges of the skirt, joining the steel body with the hard metal pin therein to the chain link at the beveled end of said body by resistance welding in a machine for welding studs onto chain links, the bodyd with the pin therein gradually being moved toward the chain link as the beveled end melts and flows radially outwards, and thereafter casehardening the chain link with the stud joined thereto, the portions of said steel body which cover said hard metal pin being operative to protect said pin from damage during said casehardening step and having a thickness which is at least equal to the casehardening penetration depth of said casehardened chain link.

* * * * *